United States Patent
Takayanagi (10) Patent No.: US 8,936,760 B2
(45) Date of Patent: Jan. 20, 2015

(54) EXHAUST GAS PURIFICATION APPARATUS FOR ENGINE

(75) Inventor: Ko Takayanagi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 259 days.

(21) Appl. No.: 13/519,375

(22) PCT Filed: Jan. 26, 2011

(86) PCT No.: PCT/JP2011/051513
§ 371 (c)(1),
(2), (4) Date: Jun. 27, 2012

(87) PCT Pub. No.: WO2011/096313
PCT Pub. Date: Aug. 11, 2011

(65) Prior Publication Data
US 2012/0288410 A1    Nov. 15, 2012

(30) Foreign Application Priority Data

Feb. 3, 2010    (JP) .................................. 2010 022298

(51) Int. Cl.
B01D 50/00    (2006.01)
B01D 46/00    (2006.01)
F01N 3/023    (2006.01)

(52) U.S. Cl.
USPC ........ 422/169; 55/282.2; 55/282.3; 55/385.3; 60/274; 60/311

(58) Field of Classification Search
USPC ............. 422/177, 180; 60/285, 286, 299, 300
See application file for complete search history.

(56) References Cited

U.S. PATENT DOCUMENTS

2005/0016137 A1 * 1/2005 Hamahata et al. .............. 55/283
2009/0199544 A1    8/2009 Etcheverry et al.

FOREIGN PATENT DOCUMENTS

DE    10 2006 000 036    8/2006
DE    10 2007 000 474    3/2008
(Continued)

OTHER PUBLICATIONS

International Preliminary Report on Patentability and Written Opinion of the International Searching Authority issued Sep. 18, 2012 in corresponding International Application No. PCT/JP2011/051513 (with English translation).
(Continued)

*Primary Examiner* — Tom Duong
(74) *Attorney, Agent, or Firm* — Wenderoth, Lind & Ponack, L.L.P.

(57) ABSTRACT

An exhaust gas purification apparatus is provided with: a first soot-accumulation calculation unit 49 which calculates a first soot accumulation amount from an operation state of the engine; a second soot-accumulation calculation unit 51 which calculates a second soot accumulation amount from a total operation time of the engine, a total fuel consumption rate, a pressure difference between front and back of the particulate filter, and the like; a first soot-accumulation correction unit 55 which corrects the first soot accumulation amount calculated by the first soot-accumulation calculation unit 49 to a value greater than the first soot-accumulation amount when the active regeneration starts based on the second soot accumulation amount calculated by the second soot-accumulation calculation unit 51; and a regeneration ending unit 57 which ends the active regeneration when, in such a case that the active regeneration starts based on the corrected soot accumulation amount, the first soot accumulation amount becomes less than a threshold value of ending the regeneration.

7 Claims, 6 Drawing Sheets

(56) References Cited

FOREIGN PATENT DOCUMENTS

| | | |
|---|---|---|
| EP | 1 529 931 | 5/2005 |
| EP | 1 722 082 | 11/2006 |
| JP | 2003-83035 | 3/2003 |
| JP | 2004-197722 | 7/2004 |
| JP | 2005-90391 | 4/2005 |
| JP | 2005-307746 | 11/2005 |
| JP | 2006-316726 | 11/2006 |
| JP | 2007-313443 | 12/2007 |
| JP | 4070687 | 4/2008 |
| JP | 4103748 | 6/2008 |
| JP | 2009-103043 | 5/2009 |

OTHER PUBLICATIONS

Notice of Allowance issued Jan. 3, 2014 in corresponding Korean application No. 10-2012-7016877 (with English translation).
Decision to grant a patent issued Sep. 25, 2013 in corresponding Japanese Application No. 2010-022298 (with English translation).
International Search Report issued Apr. 26, 2011 in corresponding International Application No. PCT/JP2011/051513.
Extended European Search Report dated Oct. 14, 2014 issued in corresponding European Patent Application No. 11739662.2.

* cited by examiner

| ITEMS TO DETERMINE STARTING | REGENERATION TEMPERATURE | REGENERATION TIME |
|---|---|---|
| PM ACCUMULATION EXCESS | Treg1 | T1 |
| PRESSURE DIFFERENCE LEVEL 1 EXCESS | Treg2 | T2 |
| PRESSURE DIFFERENCE LEVEL 2 EXCESS | Treg3 | T3 |
| ACTIVE REGENERATION INTERVAL | Treg4 | T4 |
| 0 RESET ACTIVE REGENERATION INTERVAL | Treg5 | T5 |

US 8,936,760 B2

EXHAUST GAS PURIFICATION APPARATUS FOR ENGINE

TECHNICAL FIELD

The present invention relates to an exhaust gas purification apparatus for a diesel engine, in particular to a diesel engine, which is provided with a diesel particulate filter (hereinafter called DPF) for removing soot from exhaust gas.

BACKGROUND ART

In emission regulations of diesel engines, reduction of soot is just as important as reduction of NOx. The DPF is known as an effective technology for this.

The DPF is a diesel particulate filter. While the engine operates at low exhaust temperature, the soot keeps accumulating in the DPF. The accumulated soot is removed by filter regeneration, i.e. by actively raising the temperature to burn the accumulated soot.

When estimation accuracy for estimating an amount of the soot accumulated in the DPF is low, it is hard to determine when to start or end the regeneration. This can lead to over-accumulation of the soot, resulting in adverse affect on the engine. Further, when performing the regeneration in the over-accumulation state, a significant amount of soot burns and the temperature of the DPF becomes too high, which may lead to melting of the DPF. Thus, it is necessary to estimate the accumulation state of the soot with accuracy.

In off-road vehicles such as forklifts and constructions machines, compared to on-road vehicles such as trucks, the engine operation state changes significantly. In the off-road vehicles, exhaust temperature changes significantly and in some cases, fails to meet the conditions necessary for the regeneration during the active regeneration, or the engine is turned off intentionally by an operator. This can causes frequent stopping of the active regeneration.

Therefore, it is necessary to appropriately control conditions such as the timing for resuming the active regeneration after the stopping of the regeneration and the regeneration time. When the regeneration is not resumed at the appropriate timing after the stopping of the regeneration, it could result in frequent regeneration, poor rate of fuel consumption and oil dilution.

Therefore, it is necessary to precisely determine the timings such as when to start or end the active regeneration and when to resume the active regeneration after the stopping of the regeneration. Thus, it is crucial to estimate the accumulation state of the soot with high precision.

Other than from a discharge amount of the soot, the amount of the accumulated soot can be estimated from may other indexes such as a pressure difference between front and back of the DPF, the operation time of the engine (a distance traveled), and a fuel consumption rate.

Figure 7:
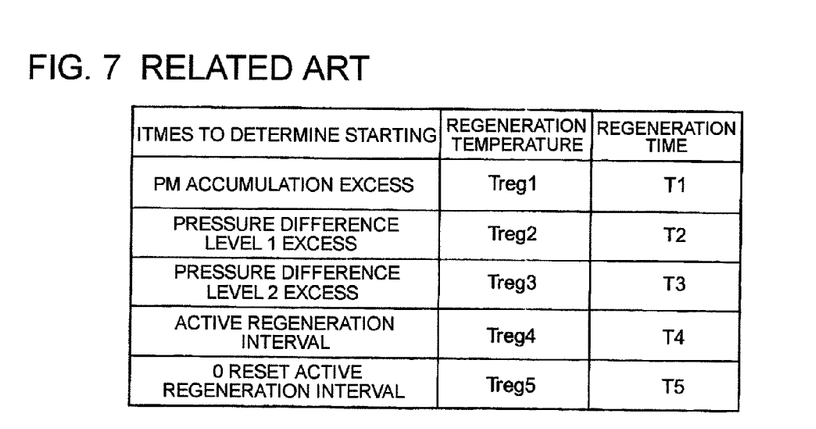
FIG. 7 is an explanatory table of related art.

For instance, disclosed in Patent Literature 1 (JP 4070687 B) is how to determine a timing to resume the regeneration by estimating an amount of PM (Particulate Matter) accumulated in the DPM, based on a calculation value (an estimation value) of PM accumulated in the DPM, a pressure difference between front and back of an exhaust gas purification apparatus, an operation time (a distance traveled), select a regeneration mode based on the determination result and then resume the regeneration. As shown in FIG. 7, regeneration temperatures and regeneration times are set in advance for corresponding regeneration modes.

CITATION LIST

Patent Literature

[PTL 1]
JP 4070687 B

SUMMARY OF INVENTION

Technical Problem

In the technique disclosed in Patent Literature 1, it is necessary to set the regeneration time and the regeneration temperature in advance for each index. This requires extra step to set parameters for each of the regeneration modes. Further, the accumulation state estimated from the calculation value of the accumulated PM may not coincide with the accumulation state estimated from each index such as the operation time of the engine.

In the Patent Literature 1, for resuming the active regeneration after the stopping of the active regeneration, the active regeneration time having been set in the beginning of the regeneration before the stopping is used to control the remaining regeneration time. This could result in frequent regenerations, poor rate of fuel consumption and oil dilution.

In view of the above issues, it is an object of the present invention to provide an exhaust gas purification apparatus for an engine, in which the timings such as when to start or end the active regeneration and when to resume the active regeneration after the stopping of the regeneration are determined based on a calculation value (an estimation value) of accumulated soot and other indexes such as a pressure difference between front and back of the DPF, the operation time of the engine (a distance traveled), and a fuel consumption rate, thereby enhancing precision of estimating the soot accumulation amount, removing the remaining soot completely, and preventing oil dilution.

Solution to Problem

To solve the above issues, as a first aspect of the present invention, an exhaust gas purification apparatus may include, but is not limited to:

a pre-oxidation catalyst which burns an unburned constituent contained in exhaust gas of an engine by catalysis;

a particulate filter which is arranged downstream of the pre-oxidization catalyst to collect soot contained in the exhaust gas a heating device which increases an amount of the unburned constituent to be supplied to the pre-oxidation catalyst to perform a active regeneration of the particulate filter;

a first soot-accumulation calculation unit which calculates a first soot accumulation amount in the particulate filter from a first index, the first index being an operation state of the engine;

a second soot-accumulation calculation unit which calculates a second soot accumulation amount from a second index, the second index being different from the first index and being at least one of a total operation time of the engine, a total fuel consumption rate, and a pressure difference between front and back of the particulate filter;

a first soot-accumulation correction unit which corrects the first soot accumulation amount calculated by the first soot-accumulation calculation unit to a value greater than the first soot-accumulation amount when the active regeneration starts based on the second soot accumulation amount calculated by the second soot-accumulation calculation unit; and a regeneration ending unit which ends the active regeneration when, in such a case that the active regeneration starts based on the corrected soot accumulation amount corrected by the first soot-accumulation correction unit, the first soot accumulation amount becomes less than a threshold value of ending the regeneration.

According to the first aspect of the present invention, the first soot-accumulation calculation unit calculates the first soot accumulation amount from the first index which is the engine operation state. More specifically, an exhaust soot amount exhausted from the engine is calculated from the rotation speed of the engine and the fuel injection amount, whereas the soot regeneration amount is calculated from the exhaust flow and the exhaust temperature. The soot regeneration amount is subtracted from the soot exhaust amount, then integrating with respect to the operation time of the engine so as to calculate the soot accumulation amount based on the operation state of the engine.

In the case where, the starting of the regeneration is determined based on the second accumulation amount calculated based on the second index instead of the first accumulation amount, the second index being different from the first index, such as a total operation time of the engine, a total fuel consumption rate, and a pressure difference between front and back of the particulate filter, the first soot accumulation amount calculated by the first soot-accumulation calculation unit is corrected to a value greater than the first soot accumulation amount. For instance, the first soot accumulation amount is corrected to one with the greatest value among the soot accumulation amounts calculated from the plural second indexes.

Then, the active regeneration starts from the corrected soot accumulation amount and then, ends when the first soot accumulation amount becomes less than a threshold value of ending the regeneration.

In this manner, the starting of the active regeneration is determined based on the second index and thus, the stating of the active regeneration can be determined with high precision and the stability of the regeneration control is improved. In other words, the timing for stating the active regeneration is basically determined based on the first soot accumulation amount calculated by the first soot-accumulation calculation unit but, by using the indexes other than the engine operation state (the second indexes) to determine the timing, it is possible to improve the precision of determining the timing for starting the active regeneration.

Further, the timing for ending the active regeneration is determined based on the value calculated by the first soot-accumulation calculation unit using the first index and thus, the timing for ending the active regeneration can be precisely determined without variability.

Furthermore, it is not necessary to set the regeneration conditions such as the regeneration time and the regeneration temperature for each of the second indexes such as the total operation time, the total fuel consumption rate and the pressure difference between the front and the back of the particulate filter and thus, data for control and the control unit can be simplified.

In the first aspect of the present invention,
when a timing to start the active regeneration is determined by the second soot accumulation amount calculated by the second soot-accumulation calculation unit, the first soot-accumulation correction unit obtains a largest amount of the soot accumulation amounts obtained from the first and second indexes, respectively, as the corrected soot accumulation amount.

In this manner, the timing for starting the active regeneration is determined from the second index and the g between the soot accumulation amount obtained from the first index and the soot accumulation amount obtained from the second index is used as the corrected soot accumulation amount. By this, the soot accumulation amount is corrected toward a safe side so as to completely remove the collected soot, thereby improving the reliability of the regeneration control.

In the first aspect of the present invention,
the soot accumulation amount in the particulate filter may be divided into a plurality of collection stages, each of the collection stages having a stage accumulation amount to start the active regeneration, and
when a timing to start the active regeneration in a certain stage is determined by the second soot accumulation amount calculated by the second soot-accumulation calculation unit, the first soot-accumulation correction unit may obtain a larger amount of the stage soot accumulation amount and the first soot accumulation amount calculated by the first soot-accumulation calculation unit as the corrected soot accumulation amount.

In this manner, the larger one of the stage accumulation amount set for each collection stage and the first accumulation amount calculated by the first soot-accumulation calculation unit, is used as the corrected soot accumulation amount and thus, in the collections stages which permits the start of the active regeneration, the first soot accumulation amount calculated by the first soot-accumulation calculation unit is corrected to a value greater than the first soot accumulation amount. As a result, the soot accumulation amount is corrected toward a safe side to completely remove the collected soot, thereby improving the reliability of the regeneration control.

Further, the soot accumulation amount in the particulate filter is categorized into a plurality of collection stages, and each of the collection stages has the stage accumulation amount (threshold) for starting the active regeneration. Thus, it is possible to set a regeneration method in accordance with each of the collection stages. For instance, when the accumulation amount is in an early stage, the automatic active regeneration is carried out, and when the automatic active regeneration is not performed or when the particulate filter is not regenerated enough and the accumulation amount has increased to a later collection stage, it is possible to let the user aware of the timing for starting the active regeneration to urge the user to carry out the active regeneration manually.

In the first aspect of the present invention,
the exhaust gas purification apparatus may further include:
a regeneration-period updating unit which updates, when the active regeneration is performed, count values of the total operation time and the total fuel consumption rate to a total operation time and a total fuel consumption rate which correspond to the soot accumulation amount calculated by the first soot-accumulation calculation unit.

In this manner, the regeneration-period updating unit updates, when the active regeneration is carried out, the count values of the total operation time and the total fuel consumption rate to a total operation time and a total fuel consumption rate which correspond to the first soot accumulation amount calculated by the first soot-accumulation calculation unit. Thus, even when the active regeneration is stopped before being completed, the appropriate total operation time and the appropriate total consumption rate can be used to determine the timing for resuming the active regeneration after the stopping of the regeneration. Therefore, it is possible to avoid the frequent regeneration which results in lowering fuel consumption and increasing oil dilution.

In the first aspect of the present invention,
the exhaust gas purification apparatus may further include:
a stopping-period updating unit which updates, when the regeneration is stopped, count values of the total operation time and the total fuel consumption rate to a total operation time and a total fuel consumption rate which correspond to the first soot accumulation amount calculated by the first soot-accumulation calculation unit.

In this manner, the stopping-period updating unit may update, when the active regeneration is stopped, the count values of the total operation time and the total fuel consumption rate to a total operation time and a total fuel consumption rate which correspond to the first soot accumulation amount calculated by the first soot-accumulation calculation unit. In a manner similar to the case, described earlier, of constantly updating the count values during the active regeneration, the appropriate total operation time and the appropriate total consumption rate can be used to determine resuming of the active regeneration after the stopping of the regeneration. Therefore, it is possible to avoid the frequent regeneration which results in lowering fuel consumption and increasing oil dilution.

As a second aspect of the present invention, an exhaust gas purification apparatus may include:
a pre-oxidation catalyst which burns an unburned constituent contained in exhaust gas of an engine by catalysis;
a particulate filter which is arranged downstream of the pre-oxidization catalyst to collect the soot contained in the exhaust gas
a heating device which increases an amount of the unburned constituent to be supplied to the pre-oxidation catalyst to perform a active regeneration of the particulate filter;
a first soot-accumulation calculation unit which calculates a soot accumulation amount in the particulate filter from a first index, the first index being an operation state of the engine;
a second soot-accumulation calculation unit which calculates a soot accumulation amount from a second index, the second index being different from the first index and being at least one of a total operation time of the engine, a total fuel consumption rate, and a pressure difference between front and back of the particulate filter; and
an updating unit which updates, in such a case that starting of the active regeneration is determined based on the soot accumulation amount calculated by the second soot-accumulation calculation unit and then the active regeneration is performed, count values of the total operation time and the total fuel consumption rate to an updated total operation time and an updated total fuel consumption rate which correspond to the soot accumulation amount calculated by the first soot-accumulation calculation unit when the regeneration is performed or stopped.

According to the second aspect of the present invention, the above updating unit updates the count values of the total operation time and the total fuel consumption rate to a total operation time and a total fuel consumption rate which correspond to the first soot accumulation amount calculated by the first soot-accumulation calculation unit. Thus, even when the active regeneration is stopped before being completed, the appropriate total operation time and the appropriate total consumption rate can be used to determine the timing for resuming the active regeneration after the stopping of the regeneration. Therefore, it is possible to avoid the frequent regeneration which results in lowering fuel consumption and increasing oil dilution.

Advantageous Effects of Invention

According to the present invention, the timings such as when to start or end the active regeneration and when to resume the active regeneration after the stopping of the regeneration can be determined based on a calculation value (an estimation value) of the soot accumulation amount and other indexes such as a pressure difference between front and back of the DPF, the operation time of the engine (a distance traveled), and a fuel consumption rate. By this, it is possible to enhance the precision of estimating the soot accumulation amount, thereby the remaining soot completely, and preventing oil dilution.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Embodiment

Figure 1:
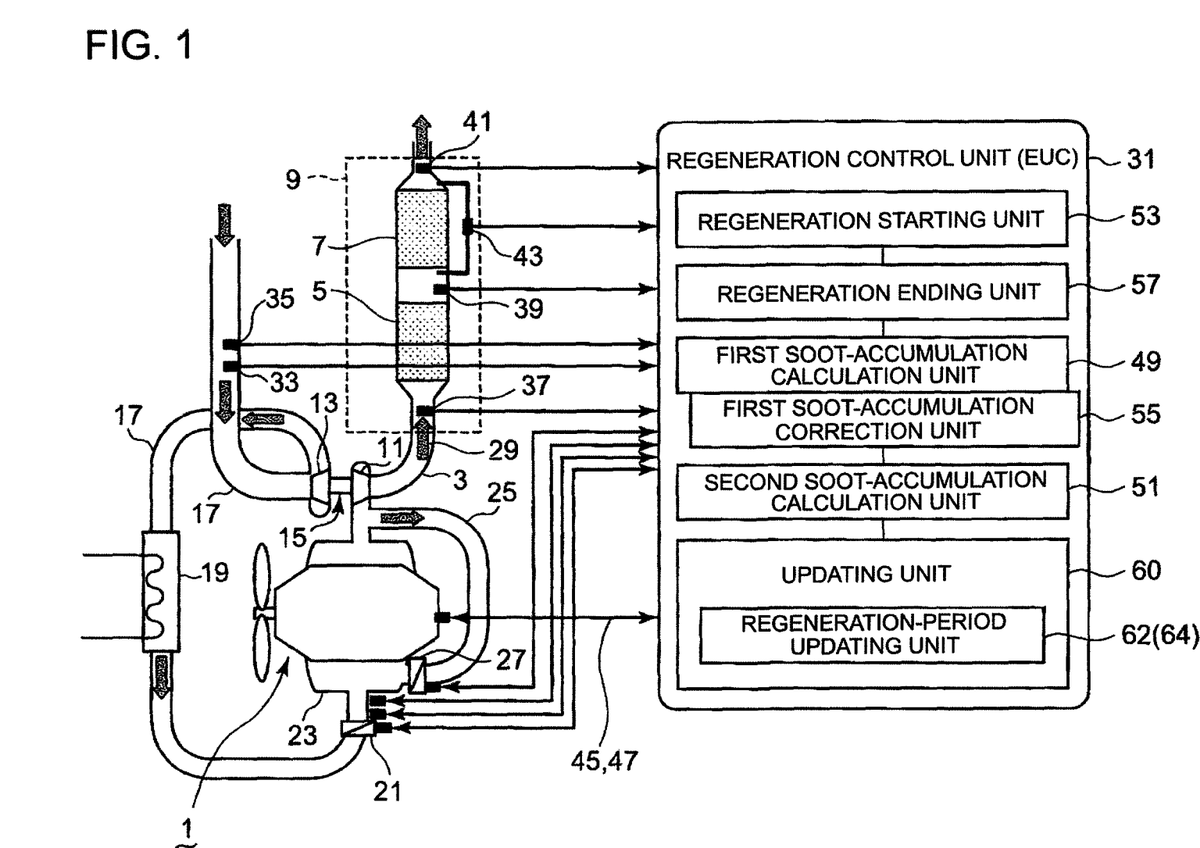
FIG. 1 is a schematic view of an overall structure of an exhaust gas purification apparatus for an engine in relation to the present invention.

In reference to FIG. 1, explained is an exhaust gas purification apparatus for a diesel engine in relation to a first embodiment of the present invention.

As shown in FIG. 1, an exhaust-gas aftertreatment device 9 is arranged in an exhaust pipe 3 of a diesel engine (hereinafter simply called as engine) 1. The exhaust-gas aftertreatment device 9 is formed by a DOC (diesel oxidation catalyst) 5 and a DPF (diesel particulate filter) 7 arranged downstream of the DOC 5 to collect soot.

Further, an exhaust turbosupercharger 15 is arranged with an exhaust turbine 11 in the exhaust pipe 3 and a compressor 13 coaxially driven by the exhaust turbine 11. The air discharged from the compressor 13 of the exhaust turbosupercharger 15 flows through an air supply pipe 17 and enters an intercooler 19 where the air is cooled. Next, the cooled air flows through an intake throttle valve 21 where the air flow is controlled and then enters a combustion chamber from an intake manifold 2 3 via an intake valve of the engine 1 through an intake port provided for each cylinder.

Although not shown in the drawing, a common rail fuel injection device is provided in the engine 1 to inject fuel into the combustion chamber by controlling an injection timing, an injection amount and an injection pressure of the fuel. The common rail fuel injection device supplies the fuel having been controlled to a prescribed fuel pressure to a fuel injection valve of each cylinder at a prescribed injection timing.

An EGR (exhaust gas recirculation) pipe 25 bifurcates in midway of the exhaust pipe 3 so that a portion of the exhaust gas is fed to a downstream section of the intake throttle valve 21 via an EGR valve.

The combustion gas generated by combustion in the combustion chamber of the engine 1, i.e. the exhaust gas 29, flows through the exhaust manifold where the exhaust ports provided for the cylinders, respectively, are collected and the exhaust pipe so as to drive the exhaust turbine 11 of the exhaust turbosupercharger 15, thereby powering the compressor 13. Then, the combustion enters the exhaust-gas aftertreatment device 9 through the exhaust pipe 3.

The DPF 7 is arranged downstream of the DOC 5. A regeneration control unit 31 for the DPF 7 is provided with an air flow meter for detecting the air flow to the compressor 33, an air supply temperature sensor 35 for detecting the temperature of the supplied air, a DOC inlet temperature sensor 37, DPF inlet temperature sensor 39, a DPF outlet temperature sensor 41, and a pressure difference sensor 43 for detecting a pressure difference between front and back of the DPF 7. To the regeneration control unit (ECU) 3, an engine speed signal 45 and a fuel injection amount signal (an engine load signal) 47 from the common rail fuel injection device are, respectively, inputted.

The regeneration control unit 31, which controls the active regeneration, performs such a control to regenerate the DPF 7 by actively burning the DPF 7 in such a case that the soot accumulated in the DPF becomes not less than a certain amount.

The regeneration control unit 31 is provided with a first soot-accumulation calculation unit 49 and a second soot-accumulation calculation unit 51. The first soot-accumulation calculation unit 49 calculates a first soot accumulation amount in the DPF 7 from a first index which is an operation state of the engine. The second soot-accumulation calculation unit 51 calculates a second soot accumulation amount from a signal (a second index) which is different from the first index and which includes at least one of a total operation time of the engine, a total fuel consumption rate, and a pressure difference between front and back of the DPF 7.

The regeneration control unit 31 is further provided with a regeneration starting unit 53, a first soot-accumulation correction unit 55 and a regeneration ending unit 57. The regeneration starting unit 53 starts the active regeneration when the first and second soot accumulation amounts calculated by the first and second soot-accumulation calculation units 49, 51 reaches a regeneration start threshold value. The first soot-accumulation correction unit 55 corrects the first soot accumulation amount calculated by the first soot-accumulation calculation unit 49 when the starting of the active regeneration is determined based on the second soot accumulation amount calculated by the second soot-accumulation calculation unit 51. The regeneration ending unit 57 ends the active regeneration when, in such a case that the active regeneration starts based on the corrected soot accumulation amount corrected by the first soot-accumulation correction unit 55, the first soot accumulation amount becomes less than a threshold value of ending the regeneration.

The first soot-accumulation calculation unit 49 calculates the first soot accumulation amount from the first index which is the engine operation state. More specifically, an exhaust soot amount exhausted from the engine is calculated from the rotation speed of the engine and the fuel injection amount, whereas the soot regeneration amount is calculated from the exhaust flow and the exhaust temperature. The soot regeneration amount is subtracted from the soot exhaust amount, then integrating with respect to the operation time of the engine so as to calculate the first soot accumulation amount based on the operation state of the engine.

Figure 2:
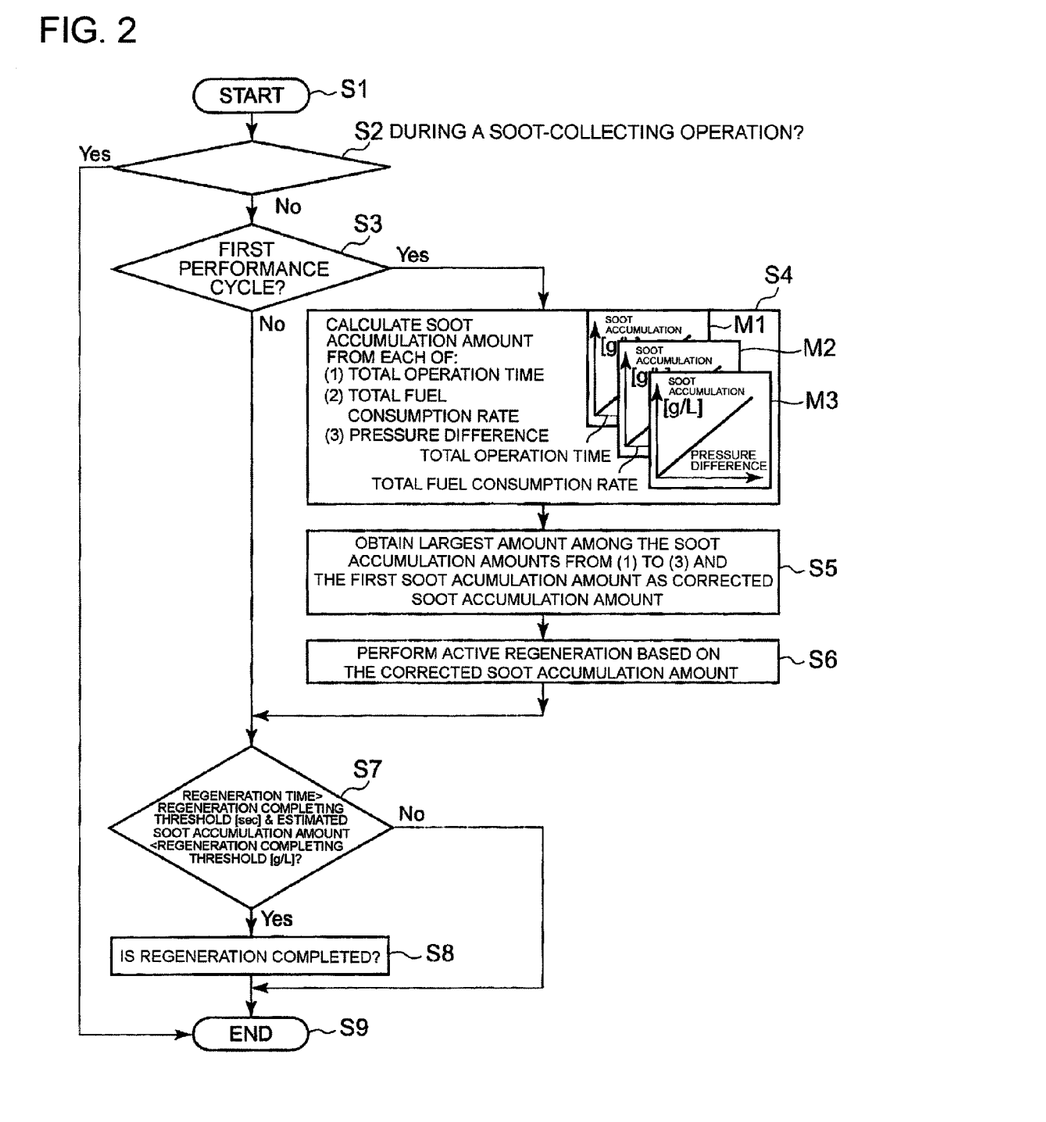
FIG. 2 is a control flow chart of a active regeneration control unit in relation to a first embodiment of the present invention.

The second soot-accumulation calculation unit 51 calculates the second soot accumulation amount as shown in a step S4 of FIG. 2. More specifically, the second soot-accumulation calculation unit 51 has maps M1, M2, M3 preset by collecting data from tests beforehand, the maps M1, M2, M3, respectively, representing a relationship between the soot accumulation amount and the pressure difference between the front and the back of the DPF 7, a relationship between the soot accumulation amount and the total fuel consumption rate, and a relationship between the soot accumulation amount and the total operation time of the engine. And the second soot accumulation amount is calculated based on a detected value of the pressure difference sensor 43, an engine speed data value and a fuel amount data value from the common rail injection device in reference to the maps M1, M2, M3, respectively.

The active regeneration control by the regeneration control unit 31 for the DPF 7 described above, is explained in reference to FIG. 2. FIG. 2 is a control flow chart of the active regeneration control.

First, the active regeneration control starts in a step S1, and then advances to a step S2 to determine whether or not it is during a soot-collecting operation. In other words, it is determined whether or not the active regeneration has started.

It is determined whether or not the active regeneration has started based on the first soot accumulation amount calculated by the first soot-accumulation calculation unit 49 but a timing for stating the active regeneration is determined from the index (the second index) other than the operation state of the engine.

More specifically, when a first one of the following values reaches the regeneration start threshold value first, the values being the first soot accumulation amount calculated by the first soot accumulation calculation unit 49, the second soot accumulation amount calculated by the second soot accumulation calculation unit 51 based on the operation time, the second soot accumulation amount calculated based on the total fuel consumption rate, and the second soot accumulation amount calculated based on the pressure difference between the front and the back of the DPF 7, the active regeneration is initiated based on the first one of the above values. Further, the regeneration start threshold value is determined using a threshold value which is set beforehand for each of the indexes.

In this manner, the starting of the active regeneration is determined when either one of the first and second soot accumulation amounts calculated by the first and second soot-accumulation calculation units 49, 51, respectively, reaches the regeneration start threshold value. Further, the above determination step is performed by the regeneration starting unit 53.

In such a case that it is determined in the step S2 that the active regeneration is initiated, the process advances to a step S3. In contrast, in such a case that it is determined that the active regeneration is not initiated, it is determined that the soot collection is performed and the process advances to a step S9 to end the process. In the step S3, it is determined whether or not it is a first performance (calculation) cycle since the initiation of the regeneration. If Yes, the process advances to the step S4 and then the step S5 in which the first soot-accumulation correction unit 55 corrects the first soot accumulation amount calculated by the first soot accumulation calculation unit 49 based on the second soot accumulation amounts calculated from the total operation time of the engine, the total fuel consumption rate, and the pressure difference between front and back of the DPF 7 (the second indexes). Then, the active regeneration is initiated from the corrected soot accumulation amount.

More specifically, in the step S4, the corrected soot accumulation amounts are calculated from 1) the total operation time of the engine, 2) the total fuel consumption rate, and 3) the pressure difference between front and back of the DPF 7 in reference to the total operation time map M1, the total fuel consumption rate map M2 and the pressure difference map M3, respectively.

In the step S5, used as the corrected soot accumulation amount is a largest soot accumulation amount among the following soot accumulation amounts: the soot accumulation amounts calculated by the second soot accumulation calculation unit 51 based on 1) the total operation time of the engine, 2) the total fuel consumption rate, and 3) the pressure difference between front and back of the DPF 7, and the first soot accumulation amount calculated by the first soot-accumulation calculation unit 49.

Figure 3:
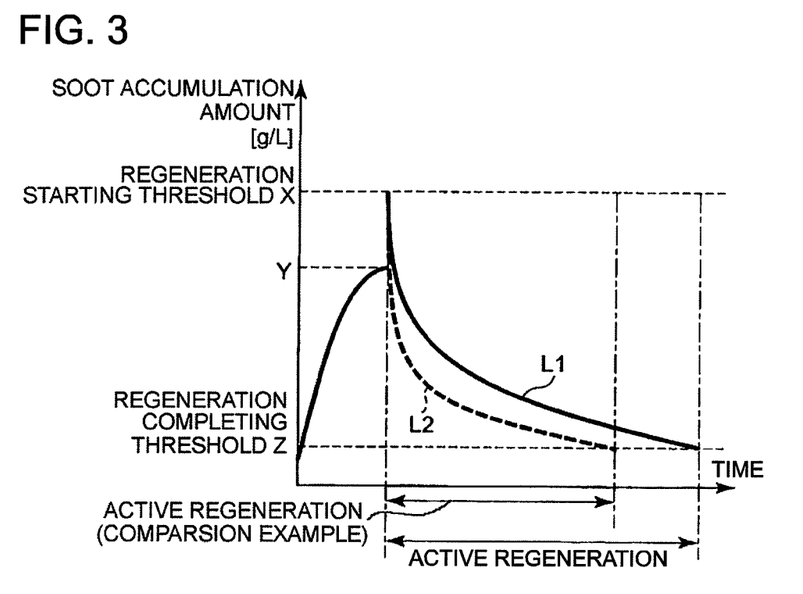
FIG. 3 is an explanatory view showing changing of a soot accumulation amount due to a active regeneration.

In a step S6, the active regeneration is performed along a line L1 from the corrected soot accumulation amount which is the accumulation amount corrected from the soot accumulation amount calculated by the first soot-accumulation calculation unit 49 to the regeneration start threshold value X (see FIG. 3).

As a comparison case, a case of using an uncorrected soot accumulation amount is shown as a line L2. In such case, the active regeneration is initiated without performing the correction, from a soot accumulation amount Y calculated by the first soot-accumulation calculation unit 49 along the line L2. In contrast, in the embodiment of the present invention, in the case where the regeneration is initiated the soot accumulation amount calculated base on 1) the total operation time of the engine, 2) the total fuel consumption rate, and 3) the pressure difference between front and back of the DPF 7, the soot accumulation amount Y is corrected by the first soot-accumulation calculation unit 49. More specifically, used as the corrected soot accumulation amount is a largest accumulation amount among the second soot accumulation amounts calculated based on the total operation time, the total fuel consumption rate, and the pressure difference between front and back of the DPF 7 and the first soot accumulation amount calculated by the first soot-accumulation calculation unit 49. Further, with the corrected soot accumulation amount at the regeneration start threshold value X, the active regeneration thereafter is performed based on the corrected soot accumulation amount.

Thus, the first soot-accumulation correction unit 55 corrects the first soot accumulation amount calculated by the first soot-accumulation calculation unit 49 to a value greater than the first soot-accumulation amount and the active regeneration is initiated using the corrected soot accumulation amount. As a result, the ending of the regeneration is determined precisely and the remaining soot is completely burned out, resulting in improved reliability. As shown in FIG. 3, the active regeneration period is extended, thereby removing the remaining soot.

The initiation of the active regeneration is briefly explained below.

Once the active regeneration starts, a DOC heating control is performed to activate the DOC 5. For instance, the opening of the intake throttle valve 21 is narrowed to restrict the flow of the air to the combustion chamber, thereby increasing the unburned fuel in the exhaust gas and the DOC is further activated by an early post-injection. The early-post injection is performed by injecting a smaller amount of fuel than that of the main injection is injected immediately after the main injection while the pressure in the cylinder is still high.

The early post-injection increases the temperature of the exhaust gas without affecting the output of the engine and by feeding the heated exhaust gas to the DOC 5, the DOC 5 is activated. By this, heat of oxidation is generated when the unburned fuel in the exhaust gas is oxidized. The heat of oxidation heats the exhaust gas.

Once the inlet temperature of the DOC 5 reaches 200 to 400° C., the inlet temperature of the DPF 7 is further increased by a late post-injection. The late post-injection is performed by injecting fuel in such a state that the crank angle is near the bottom dead center after the early post-injection. The late post-injection causes the fuel to flow to the exhaust pipe 3 from the combustion camber while the exhaust valve is open. The discharged fuel reacts in the DOC 5 having been activated, thereby further heating the exhaust gas by the heat of oxidation. By this, the DPF 7 is heated to a temperature which is high enough to regenerate the DPF 7, for instance to 600° C., so as to accelerate combustion of the soot.

Next, the process advances to a step S7 in which it is determined by the regeneration ending unit 57 whether or not the following conditions are met: the regeneration time since the regeneration is started is greater than a target regeneration time for achieving a regeneration completing threshold value Z, and the first soot accumulation amount calculated by the first soot-accumulation calculation unit 49 is below the regeneration completing threshold value Z.

If it is determined that the above conditions are met, the process advances to a step S8 to complete the active regeneration and end the process. If it is determined that the above conditions are not met, the process advances to a step S9 to end the process without completing the active regeneration. Further, the target regeneration time from starting the regeneration to reaching the regeneration completing threshold value, uses a data value which is set beforehand in correspondence with the initial soot accumulation amount when the regeneration is initiated. The regeneration completing threshold value Z is set beforehand as well.

According to the first embodiment, the timing for starting the active regeneration is determined based on the second indexes which include the total operation time, the total fuel consumption rate or the pressure difference between the front and back of the DPF. Thus, the timing for stating the active regeneration can be determined with high precision and the stability of the regeneration control is improved. In other words, the timing for stating the active regeneration is basically determined based on the first soot accumulation amount calculated by the first soot-accumulation calculation unit but, by using the indexes other than the engine operation state (the second indexes) to determine the timing, it is possible to improve the precision of determining the timing for starting the active regeneration.

Further, the timing for ending the active regeneration is determined based on the value calculated by the first soot-accumulation calculation unit using the first index and thus, the timing for ending the active regeneration can be precisely determined without variability.

Furthermore, it is not necessary to set the regeneration conditions such as the regeneration time and the regeneration temperature for each of the second indexes such as the total operation time, the total fuel consumption rate and the pressure difference between the front and the back of the particulate filter and thus, data for control and the control unit can be simplified.

Second Embodiment

Figure 4:
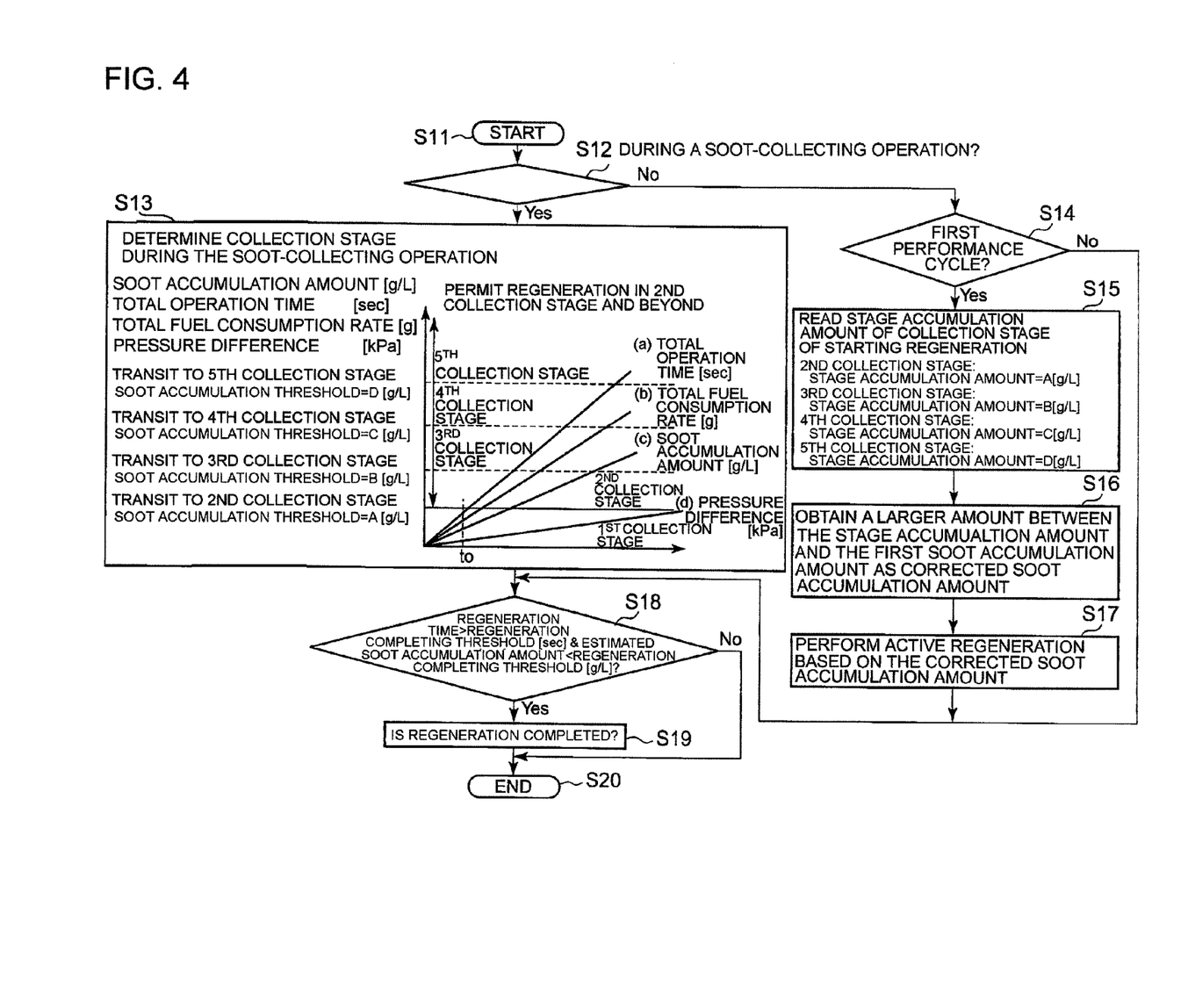
FIG. 4 is a control flow chart of the active regeneration control unit in relation to a second embodiment.

A second embodiment is explained in reference to FIG. 4. In the second embodiment, there are a plurality of collection stages for different amounts of soot accumulated in DPF 7.

The control starts in a step S11 and then advances to a step S12 to determine whether or not it is during a soot-collecting operation. The determination step is described later in details.

If it is determined in the step S12 that the active regeneration is not started, the process advances to a step S13 to determine which collection stage it belongs to while the soot-collecting operation being performed. It is determined which collection stage the amount of soot accumulated in the DPF 7 belongs to based on the first soot accumulation amount calculated by the first soot-accumulation calculation unit 49. There are first through fifth collection stages which are divided by stage threshold values A, B, C, D, respectively.

In the second collection stage and beyond, the regeneration is permitted. In the second collection stage, an automatic active regeneration is carried out during the engine operation. In the third and fourth collection stages, a manual active regeneration is carried out manually by a user. In the fifth collection stage, the DPF 7 is transferred to a repair factory or the like and the regeneration is carried out there. Specifically, the regeneration is categorized into the plural collection stages in accordance with particular methods of carrying out the active regeneration.

The graph in the step S13 illustrates the divided collection stages and shows time on the horizontal axis and the soot accumulation amount on the vertical axis. In the graph, there are four characteristic lines (a) through (d) each illustrating change of the soot accumulation amount over time. The four characteristic lines (a) to (d) indicate the total operation time (a), the total fuel consumption rate (b), the soot accumulation amount (c) and a pressure difference between front and back of the DPF (d), respectively.

For instance, as for the second collection stage, as time passes, the soot accumulation amounts calculated from the total operation time (a), the total fuel consumption rate (b), the soot accumulation amount (c) and the pressure difference (d) enter the second collection stage in this order.

In this manner, it is determined in the step S13 which collection stage it belongs to. Next, the process advances to the step S18 and then to the step S20 to end the process.

Meanwhile, in the step S12, it is determined whether or not it is during the soot-collecting operation. The starting of the active regeneration is determined in the step S13. When any one of the accumulation amounts calculated from the total operation time (a), the total fuel consumption rate (b), the soot accumulation amount (c) and the pressure difference (d) enters a respective collection stage among the second to fifth stages (and beyond) in which the regeneration is permitted, the starting of the active regeneration in the respective collection stage is determined.

As shown in the step S13, the soot accumulation amount calculated from the total operation time (a) reaches a soot accumulation threshold A first and then ($t_0$) the starting of the active regeneration is determined.

In this manner, when the starting of the regeneration is determined, it is determined in the step S14 whether or not it is a first performance (calculation) cycle since the initiation of the regeneration. If Yes, the process advances to a step S15 and then the step S16 in which the first soot-accumulation correction unit 55 corrects the first soot accumulation amount calculated by the first soot accumulation calculation unit 49.

More specifically, the correction is performed in the step S15, the first through fifth collection stages are read. The stage accumulation amount is the same value as the soot accumulation threshold value of transiting from one stage to another. The stage accumulation amount of the second collection stage is the value A, the stage accumulation amount of the third collection stage is the value B, the stage accumulation amount of the fourth collection stage is the value C, and the stage accumulation amount of the fifth collection stage is the value D.

Next, in the step S16, a larger amount of the stage accumulation amount A of the second collection stage and the first accumulation amount calculated by the first soot-accumulation calculation unit 49, is used as the corrected soot accumulation amount.

For instance, in the case of the collection stage in the beginning of the regeneration being the second collection stage, at $t_0$ of the step S13, the value calculated by the first soot-accumulation calculation unit 49 is the soot accumulation amount (c) and is smaller than the stage accumulation amount A of the second collection stage. The soot accumulation amount is corrected to the stage accumulation amount A which is greater than the value calculated by the first soot-accumulation calculation unit 49. If the soot accumulation amount (c) which is the value calculated by the first soot-accumulation calculation unit 49 is greater than the stage accumulation amount A, the value calculated by the first soot-accumulation calculation unit 49 is used as the corrected soot accumulation amount.

Further, the corrected soot accumulation amount having been set when the accumulation amount enters the second collection stage is maintained until the accumulation amount enters the third collection stage, or until the active regeneration is stopped or completed. The stopping of the active regeneration is described later in third and fourth embodiments.

Next, in a step S17, in a manner similar to the first embodiment, the active regeneration is performed from the corrected soot accumulation amount which is the accumulation amount corrected from the soot accumulation amount calculated by the first soot-accumulation calculation unit 49 to the regeneration start threshold value X (see FIG. 3).

Next, the process advances to a step S18 in which it is determined by the regeneration ending unit 57 whether or not the following conditions are met: the regeneration time since the regeneration is started is greater than the target regeneration time for achieving the regeneration completing threshold value, and the first soot accumulation amount calculated by the first soot-accumulation calculation unit 49 is below the regeneration completing threshold value Z.

If it is determined that the above conditions are met, the process advances to a step S19 to complete the active regeneration and end the process. If it is determined that the above conditions are not met, the process advances to a step S20 to end the process without completing the active regeneration.

According to the second embodiment, the larger one of the stage accumulation amount set for each collection stage and the first accumulation amount calculated by the first soot-accumulation calculation unit 49, is used as the corrected soot accumulation amount and thus, in the collections stages which permits the start of the active regeneration, the first soot accumulation amount calculated by the first soot-accumulation calculation unit 49 is corrected to a value greater than the first soot accumulation amount. As a result, the soot accumulation amount is corrected toward a safe side so as to completely remove the collected soot, thereby improving the reliability of the regeneration control.

Further, the soot accumulation amount in the DPF 7 is divided into a plurality of collection stages, and each of the collection stages has the stage accumulation amount (threshold) for starting the active regeneration. Thus, it is possible to set a regeneration method in accordance with each of the collection stages.

For instance, when the accumulation amount is in an early stage, the automatic active regeneration is carried out, and when the automatic active regeneration is not performed or when the DPF is not regenerated enough and the accumulation amount has increased to a later collection stage, it is possible to let the user aware of the timing for starting the active regeneration to urge the user to carry out the active regeneration manually.

Third Embodiment

Figure 5A:
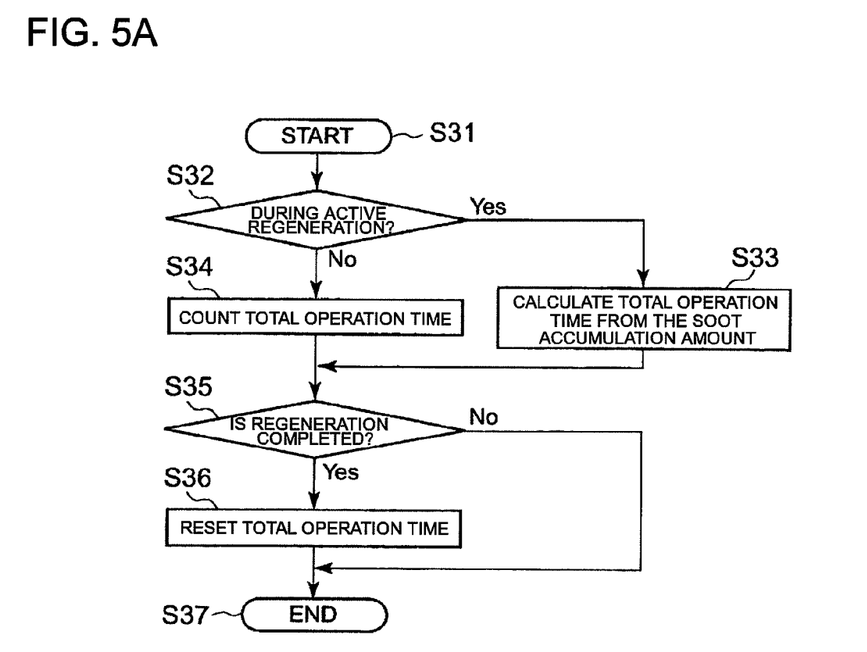
FIG. 5A is a control flow chart of the active regeneration control unit in relation to a third embodiment.
Figure 5B:
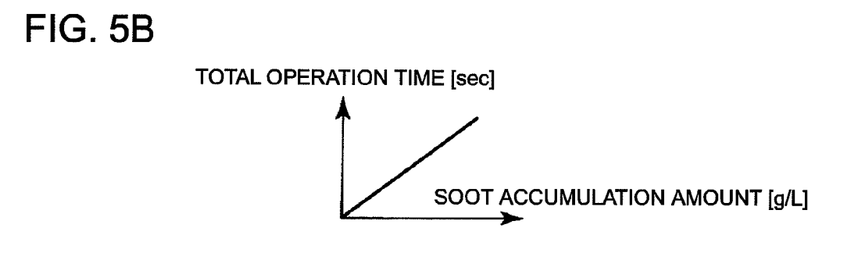
FIG. 5B shows a relationship between a total operation time and the soot accumulation amount in relation to the third embodiment.

A third embodiment is explained in reference to FIG. 5. An updating unit 60 is provided in the third embodiment. The updating unit 60 updates, when the active regeneration is performed, count values of the total operation time and the total fuel consumption rate to a total operation time and a total fuel consumption rate which correspond to the soot accumulation amount calculated by the first soot-accumulation calculation unit 49. The updating unit 60 includes a regeneration-period updating unit 62 which updates the count values by reflecting results of the calculation during the regeneration constantly, or a stopping-period updating unit 64 which updates the count values by reflecting the calculation result when the active regeneration is stopped. The stopping of the active regeneration is explained later in the fourth embodiment. In the third embodiment, the regeneration-period updating unit 62 is explained.

In a flow chart of FIG. 5A, the process starts in a step S31 and it is determined in a step S32 whether or not it is during the active regeneration. This determination is similar to the step S2 of the first embodiment and the step S12 of the second embodiment. If it is determined as during the active regeneration in the step S32, the process advances to a step S33 to calculate the total operation time from the first soot accumulation amount calculated by the first soot-accumulation calculation unit 49. The calculation is conducted using a relationship formula or graph which has a preset relationship between the total operation time and the soot accumulation amount as shown in FIG. 5B. And, the total operation time corresponding to the first soot accumulation amount is constantly calculated to update a memory data value.

If it is determined in the step S32 that it is not during the active regeneration, the process advances to a step S34 to count the total operation time. Next, in a step S35, it is determined whether or not the active regeneration is completed. If it is determined that the active regeneration is completed, the process advances to a step S36 to reset the total operation time, whereas if it is determined that the active regeneration is not completed, the process advances to a step S37 to end the process.

The total operation time is described above. The total fuel consumption rate is obtained in a manner similar to the total operation time and can be obtained simply by replacing the total operation time with the total fuel consumption rate in the flow chart of FIG. 5A. Further, both the total operation time and the total fuel consumption rate may be calculated in conjunction to update the count values.

According to the third embodiment, the regeneration-period updating unit 62 updates, when the active regeneration is carried out, the count values of the total operation time and the total fuel consumption rate to a total operation time and a total fuel consumption rate which correspond to the first soot accumulation amount calculated by the first soot-accumulation calculation unit 49. Thus, even when the active regeneration is stopped before being completed, the appropriate total operation time or the appropriate total consumption rate can be used to determine the timing for resuming the active regeneration after the stopping of the regeneration.

Therefore, it is possible to avoid the frequent regeneration which results in lowering fuel consumption and increasing oil dilution. Further, it is possible to prevent overheating of the DPF 7 during the active regeneration, which is caused by over-accumulation of the soot in DPF 7.

Fourth Embodiment

Figures 6A, 6B:
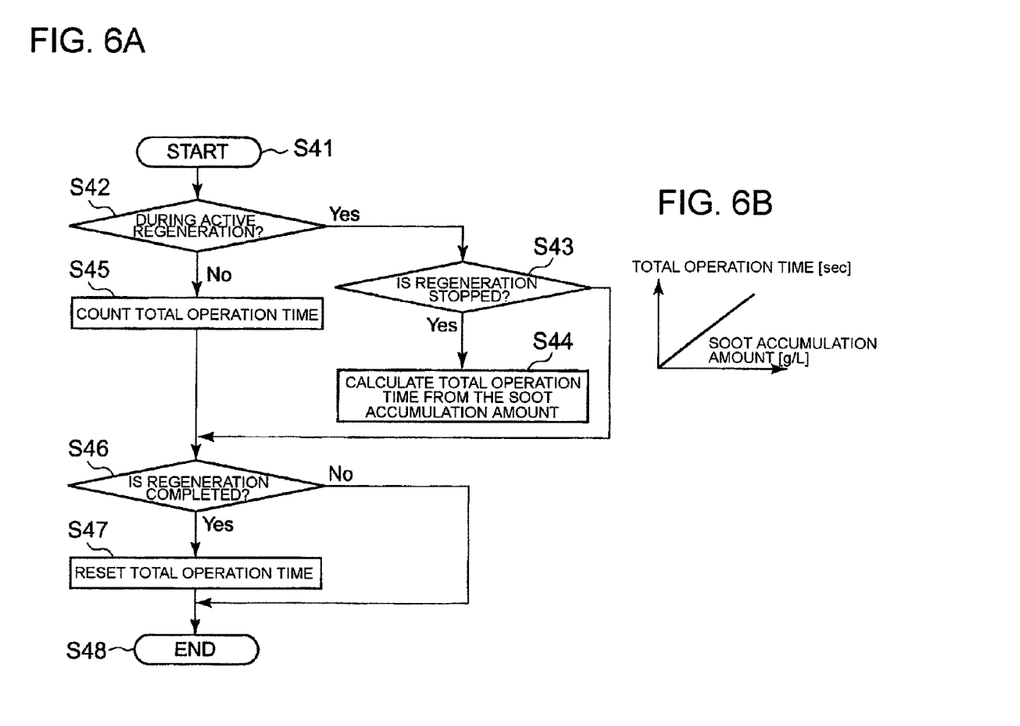
FIG. 6A is a control flow chart of the active regeneration control unit in relation to a fourth embodiment of the present invention.
FIG. 6B shows a relationship between a total operation time and the soot accumulation amount in relation to the fourth embodiment.

A fourth embodiment is explained in reference to FIG. 6. In the fourth embodiment, the stopping-period updating unit 64 is described instead of the regeneration-period updating unit 62 of the third embodiment. The stopping-period updating unit 64 updates, when the regeneration is stopped, count values of the total operation time and the total fuel consumption rate to a total operation time and a total fuel consumption rate which correspond to the first soot accumulation amount calculated by the first soot-accumulation calculation unit 49.

The flow chart of the control by the stopping-period updating unit 64 is shown in FIG. 6A. The control starts in a step S41 and then advances to a step S42 to determine whether or not it is during the active regeneration. The determination step is substantially the same as the step S2 of the first embodiment and the step S12 of the second embodiment. If it is determined in the step S42 to be in middle of the active regeneration, the process advances to a step S43 to determine whether or not the active regeneration is stopped before being completed. If the regeneration is stopped before being completed, the process advances to a step S44 to calculated the total operation time from the first soot accumulation amount calculated by the first soot-accumulation calculation unit 49. The calculation is conducted using a relationship formula or graph which has a preset relationship between the total operation time and the soot accumulation amount as shown in FIG. 6B. And, the total operation time corresponding to the first soot accumulation amount is constantly calculated to update a memory data value. In other words, the total operation time is calculated when the active regeneration is stopped, so as to update the memory data value.

If it is determined in the step S42 that it is not during the active regeneration, the process advances to a step S45 to count the total operation time. Next, in a step S46, it is determined whether or not the active regeneration is completed. If it is determined that the active regeneration is completed, the process advances to a step S47 to reset the total operation time, whereas if it is determined that the active regeneration is not completed, the process advances to a step S48 to end the process.

The total operation time is described above. The total fuel consumption rate is obtained in a manner similar to the total operation time and can be obtained simply by replacing the total operation time with the total fuel consumption rate in the flow chart of FIG. 6A. Further, both the total operation time and the total fuel consumption rate may be calculated in conjunction to update the count values.

According to the fourth embodiment, the stopping-period updating unit 64 updates, when the active regeneration is stopped, the count values of the total operation time and the total fuel consumption rate to a total operation time and a total fuel consumption rate which correspond to the first soot accumulation amount calculated by the first soot-accumulation calculation unit 49. In a manner similar to the third embodiment where the regeneration-period updating unit 62 constantly updates the count values during the active regeneration, the appropriate total operation time and the appropriate total consumption rate can be used to determine resuming of the active regeneration after the stopping of the regeneration.

Therefore, it is possible to avoid the frequent regeneration which results in lowering fuel consumption and increasing oil dilution. Further, it is possible to prevent overheating of the DPF 7 during the active regeneration, which is caused by over-accumulation of the soot in DPF 7.

INDUSTRIAL APPLICABILITY

According to the present invention, the timings such as when to start or end the active regeneration and when to resume the active regeneration after the stopping of the regeneration can be determined based on a calculation value (an estimation value) of the soot accumulation amount and other indexes such as a pressure difference between front and back of the DPF, the operation time of the engine (a distance traveled), and a fuel consumption rate. By this, it is possible to enhance the precision of estimating the soot accumulation amount, thereby the remaining soot completely, and preventing oil dilution. Therefore, the present invention is applicable to an exhaust gas purification apparatus for a diesel engine.

The invention claimed is:

1. An exhaust gas purification apparatus comprising:
  a pre-oxidation catalyst configured to burn an unburned constituent contained in exhaust gas of an engine by catalysis;
  a particulate filter arranged downstream of the pre-oxidation catalyst to collect soot contained in the exhaust gas;
  a heating device configured to increase an amount of the unburned constituent to be supplied to the pre-oxidation catalyst to perform an active regeneration of the particulate filter;
  a first soot-accumulation calculation unit configured to calculate a first soot accumulation amount in the particulate filter from a first index, the first index being an operation state of the engine;
  a second soot-accumulation calculation unit configured to calculate a second soot accumulation amount from a second index, the second index being different from the first index and being at least one of a total operation time of the engine, a total fuel consumption rate, or a pressure difference between a front and back of the particulate filter;
  a regeneration starting unit configured to determine a starting of active regeneration when either one of the first soot accumulation amount and the second soot accumulation amount reaches a regeneration start threshold value;
  a first soot-accumulation correction unit configured to correct the first soot accumulation amount calculated by the first soot-accumulation calculation unit to a value greater than the first soot accumulation amount when the starting of active regeneration is determined by the regeneration starting unit based on the second soot accumulation amount calculated by the second soot-accumulation calculation unit; and
  a regeneration ending unit configured to end the active regeneration when, in such a case that the active regeneration starts based on the corrected soot accumulation amount corrected by the first soot-accumulation correction unit, the first soot accumulation amount becomes less than a threshold value of ending the regeneration.

2. The exhaust gas purification apparatus according to claim 1, wherein, when a timing to start the active regeneration is determined by the second soot accumulation amount calculated by the second soot-accumulation calculation unit, the first soot-accumulation correction unit is configured to obtain a largest amount of the first and second soot accumulation amounts calculated from the first and second indexes, respectively, as the corrected soot accumulation amount.

3. The exhaust gas purification apparatus according to claim 1, wherein the soot accumulation amount in the particulate filter is divided into a plurality of collection stages, each of the collection stages having a stage accumulation amount to start the active regeneration, and
  wherein, when a timing to start the active regeneration in a certain stage is determined by the second soot accumulation amount calculated by the second soot-accumulation calculation unit, the first soot-accumulation correction unit is configured to obtain a larger amount of the stage soot accumulation amount and the first soot accumulation amount calculated by the first soot-accumulation calculation unit as the corrected soot accumulation amount.

4. The exhaust gas purification apparatus according to claim 1, further comprising:
  a regeneration-period updating unit configured to update, when the active regeneration is performed, count values of the total operation time and the total fuel consumption rate to a total operation time and a total fuel consumption rate which correspond to the first soot accumulation amount calculated by the first soot-accumulation calculation unit.

5. The exhaust gas purification apparatus according to claim 1, further comprising:
  a stopping-period updating unit configured to update, when the regeneration is stopped, count values of the total operation time and the total fuel consumption rate to a total operation time and a total fuel consumption rate which correspond to the first soot accumulation amount calculated by the first soot-accumulation calculation unit.

6. An exhaust gas purification apparatus comprising:
  a pre-oxidation catalyst configured to burn an unburned constituent contained in exhaust gas of an engine by catalysis;
  a particulate filter arranged downstream of the pre-oxidation catalyst to collect the soot contained in the exhaust gas;
  a heating device configured to increase an amount of the unburned constituent to be supplied to the pre-oxidation catalyst to perform an active regeneration of the particulate filter;
  a first soot-accumulation calculation unit configured to calculate a soot accumulation amount in the particulate filter from a first index, the first index being an operation state of the engine;
  a second soot-accumulation calculation unit configured to calculate a soot accumulation amount from a second index, the second index being different from the first index and being at least one of a total operation time of the engine, a total fuel consumption rate, or a pressure difference between a front and back of the particulate filter;
  a regeneration starting unit configured to determine a starting of active regeneration when either one of the soot accumulation amount calculated by the first soot-accumulation calculation unit and the soot accumulation amount calculated by the second soot-accumulation calculation unit reaches a regeneration start threshold value; and an updating unit configured to update, in such a case that starting of the active regeneration is determined by the regeneration starting unit based on the soot accumulation amount calculated by the second soot-accumulation calculation unit and then the active regeneration is performed, count values of the total operation time and the total fuel consumption rate to an updated total operation time and an updated total fuel consumption rate which correspond to the soot accumulation amount calculated by the first soot-accumulation calculation unit when the regeneration is performed or stopped.

7. An exhaust gas purification apparatus comprising:

a pre-oxidation catalyst configured to burn an unburned constituent contained in exhaust gas of an engine by catalysis;

a particulate filter arranged downstream of the pre-oxidization catalyst to collect soot contained in the exhaust gas;

a heating device configured to increase an amount of the unburned constituent to be supplied to the pre-oxidation catalyst to perform an active regeneration of the particulate filter;

a first soot-accumulation calculation unit configured to calculate a first soot accumulation amount in the particulate filter from a first index, the first index being an operation state of the engine;

a second soot-accumulation calculation unit configured to calculate a second soot accumulation amount from a second index, the second index being different from the first index and being at least one of a total operation time of the engine, a total fuel consumption rate, or a pressure difference between a front and back of the particulate filter;

a first soot-accumulation correction unit configured to correct the first soot accumulation amount calculated by the first soot-accumulation calculation unit to a value greater than the first soot-accumulation amount after the active regeneration starts based on the second soot accumulation amount calculated by the second soot-accumulation calculation unit; and a regeneration ending unit configured to end the active regeneration when, in such a case that the active regeneration starts based on the corrected soot accumulation amount corrected by the first soot-accumulation correction unit, the first soot accumulation amount becomes less than a threshold value of ending the regeneration, wherein the soot accumulation amount in the particulate filter is divided into a plurality of collection stages, each of the collection stages having a stage accumulation amount to start the active regeneration, and wherein, when a timing to start the active regeneration in a certain stage is determined by the second soot accumulation amount calculated by the second soot-accumulation calculation unit, the first soot-accumulation correction unit is configured to obtain a larger amount of the stage soot accumulation amount and the first soot accumulation amount calculated by the first soot-accumulation calculation unit as the corrected soot accumulation amount.

* * * * *